(12) United States Patent
Rofougaran

(10) Patent No.: US 8,965,309 B2
(45) Date of Patent: Feb. 24, 2015

(54) METHOD AND SYSTEM FOR CALIBRATING A POWER AMPLIFIER

(75) Inventor: Ahmadreza Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 2201 days.

(21) Appl. No.: 11/857,067

(22) Filed: Sep. 18, 2007

(65) Prior Publication Data

US 2009/0075688 A1    Mar. 19, 2009

(51) Int. Cl.
*H04B 17/00* (2006.01)

(52) U.S. Cl.
CPC .......... *H04B 17/001* (2013.01); *H04B 17/0062* (2013.01)
USPC .................................... 455/115.1; 455/127.1

(58) Field of Classification Search
USPC ............... 455/91, 114.1–114.3, 115.1–115.3, 455/126, 127.1, 127.2, 127.3; 330/129, 149
See application file for complete search history.

(56) References Cited

U.S. PATENT DOCUMENTS

2006/0160506 A1* 7/2006 Smentek et al. ............ 455/127.3
2006/0189285 A1* 8/2006 Takano et al. .............. 455/127.2

* cited by examiner

*Primary Examiner* — Thanh Le
(74) *Attorney, Agent, or Firm* — Oblon, Spivak, McClelland, Maier & Neustadt, L.L.P.

(57) ABSTRACT

Aspects of a method and system for calibrating a power amplifier are provided. In this regard, one or more reference signals may be generated and may be utilized to characterize a signal strength indicator (SSI). Additionally, measurements of power output by a power amplifier by the SSI may be corrected based on the characterization of the SSI. Accordingly, the power amplifier may be adjusted based on the corrected measurements. The reference signals utilized to characterize the SSI may be limited to a determined range. In this regard, signal strength of the reference signals, as measured by the SSI, may be compared to the expected signal strength in order to characterize the SSI. The SSI may be characterized over a range of frequencies and/or signal strengths. Similarly the power amplifier may be adjusted over a range of frequencies and/or signal strengths.

24 Claims, 8 Drawing Sheets

METHOD AND SYSTEM FOR CALIBRATING A POWER AMPLIFIER

CROSS-REFERENCE TO RELATED APPLICATIONS/INCORPORATION BY REFERENCE

Not Applicable

FIELD OF THE INVENTION

Certain embodiments of the invention relate to wireless communication. More specifically, certain embodiments of the invention relate to a method and system for calibrating a power amplifier.

BACKGROUND OF THE INVENTION

With the rapidly increasing dependence on electronic communications and the accompanying efforts to make these communications faster and cheaper, the complexity of designing communications systems is also increasing. For example, available frequency bands, which are regulated by organizations such as the FCC in the USA, are becoming increasingly scarce. Moreover, existing frequency bands are becoming increasingly congested due to the plethora of users and devices in existence. Accordingly, designing devices that can reliably operate in such noisy frequency bands is becoming increasingly difficult and costly. Another example of the complexities facing communication system designers is that making communication devices faster and cheaper often means integrating more functionality into smaller chips and systems. In this regard, although increased integration may lead to lower product cost, it may also greatly increase the amount of effort required for designing such systems. For example, due to variations in fabrication processes integrated systems can exhibit significant differences in performance between lots and even between wafers. Accordingly, ways for tuning and/or characterizing integrated systems are needed in order to provide consistent performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for calibrating a power amplifier, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for calibrating a power amplifier. In this regard, one or more reference signals may be generated and may be utilized to characterize a signal strength indicator. Additionally, measurements of power output by a power amplifier by the signal strength indicator (SSI) may be corrected based on the characterization of the SSI. Accordingly, the power amplifier may be adjusted based on the corrected measurements. The reference signals utilized to characterize the SSI may be limited to a determined range. In this regard, signal strength of the reference signals, as measured by the SSI, may be compared to the expected signal strength in order to characterize the SSI. The SSI may be characterized over a range of frequencies and/or signal strengths. Similarly the power amplifier may be adjusted over a range of frequencies and/or signal strengths.

Figure 1:
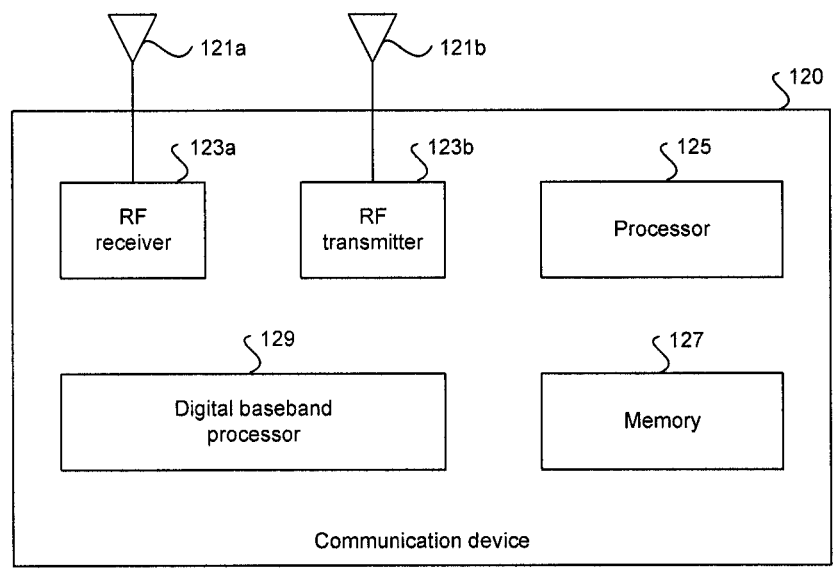
FIG. 1 is a block diagram illustrating an exemplary RF communication device, in accordance with an embodiment of the invention.

FIG. 1 is a block diagram illustrating an exemplary RF communication device, in accordance with an embodiment of the invention. Referring to FIG. 1, there is shown a RF communication device 120 that may comprise an RF receiver 123a, an RF transmitter 123b, a digital baseband processor 129, a processor 125, and a memory 127. A receive antenna 121a may be communicatively coupled to the RF receiver 123a. A transmit antenna 121b may be communicatively coupled to the RF transmitter 123b. The RF communication device 120 may be operated in a system, such as the cellular network and/or digital video broadcast network, for example.

The RF receiver 123a may comprise suitable logic, circuitry, and/or code that may enable processing of received RF signals. The receiver 123a may be enabled to generate signals, such as local oscillator signals, for the reception and processing of RF signals. The RF receiver 123a may down-convert received RF signals. The RF receiver 123a may perform direct down-conversion of the received RF signal to a baseband frequency signal, for example. In some instances, the RF receiver 123a may enable analog-to-digital conversion of the baseband signal components before transferring the components to the digital baseband processor 129 for processing. In other instances, the RF receiver 123a may transfer the baseband signal components in analog form to the baseband processor 129 for processing.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b. In this regard signals received by the digital baseband processor 129 may be either digital, analog, or mixed analog and digital. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The transmitter 123b may be enabled to generate signals, such as local oscillator signals, for the transmission and processing of RF signals. The RF transmitter 123b may up-convert the baseband frequency signal. The RF transmitter 123b may perform direct up-conversion of the baseband frequency signal to a RF signal of approximately 60 GHz, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the RF communication device 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the RF communication device 120. The processor 125 may also enable executing of applications that may be utilized by the RF communication device 120. For example, the processor 125 may execute applications that may enable displaying and/or interacting with content received via RF signals in the RF communication device 120.

The memory 127 may comprise suitable logic, circuitry, and/or code that may enable storage of data and/or other information utilized by the RF communication device 120. For example, the memory 127 may be utilized for storing processed data generated by the digital baseband processor 129 and/or the processor 125. The memory 127 may also be utilized to store information, such as configuration information, that may be utilized to control the operation of at least one block in the RF communication device 120. For example, the memory 127 may comprise information necessary to configure the RF receiver 123a to enable receiving signals in the appropriate frequency band.

Figure 2:
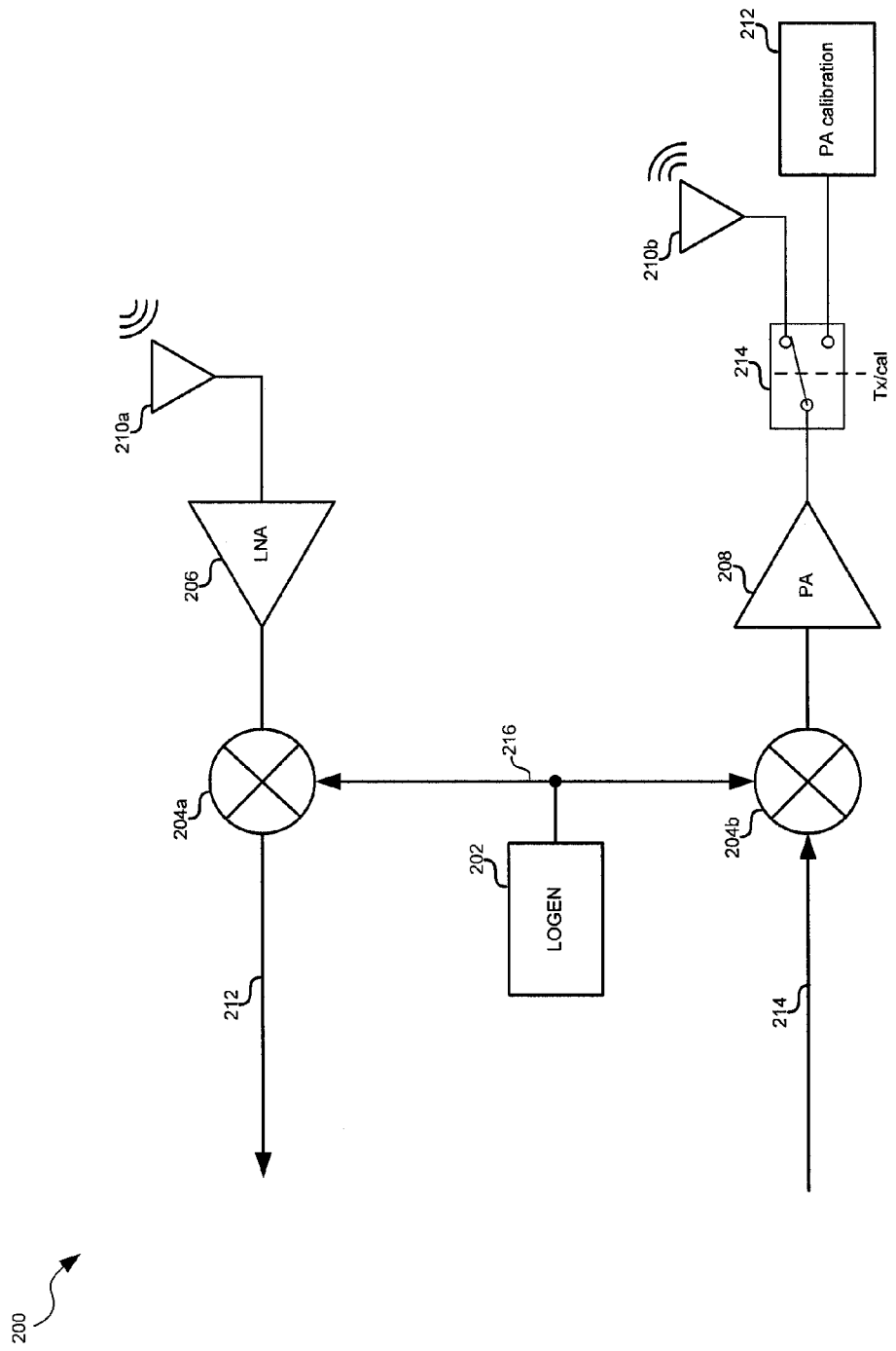
FIG. 2 is a diagram of a transceiver comprising a PA calibration block which may enable transmission and/or reception of signals up to EHF, in accordance with an embodiment of the invention.

FIG. 2 is a diagram of a transceiver comprising a PA calibration block which may enable transmission and/or reception of signals up to EHF, in accordance with an embodiment of the invention. Referring to FIG. 2 there is shown a transceiver 200 which may be all or a portion of the RF receiver 123a, for example. The transceiver 200 may comprise local oscillator generator (LOGEN) 202, mixers 204a and 204b, a low noise amplifier (LNA) 206, a power amplifier 208, antennas 210a and 210b, and PA calibration block 212.

The LOGEN 202 may comprise suitable logic, circuitry, and/or code that may enable generating a reference signal. In various embodiments of the invention, the signal generator 202 may comprise, for example, one or more VCO's, PLLs, and/or direct digital frequency synthesizers (DDFSs). In an exemplary embodiment, of the invention, the transceiver 200 may directly convert between RF and baseband. Accordingly, the frequency of the signal 416, $F_{LO}$, may be $(F_{RF} \pm F_{baseband})$.

The mixers 204a and 204b may comprise suitable logic, circuitry, and/or code that may enable generation of intermodulation products resulting from mixing the input signal 212 and the delayed signal 214. In this regard, the mixers 204a and 204b may be similar to or the same as the mixer 204 described in FIG. 2.

The LNA 206 may comprise suitable logic, circuitry, and/or code that may enable buffering and/or amplification of received RF signals. In this regard, the gain of the LNA 206 may be adjustable to enable reception of signals of varying strength. Accordingly, the LNA 206 may receive one or more control signals from a processor such as the processors 125 and 129.

The PA 208 may comprise suitable logic, circuitry, and/or code that may enable buffering and/or amplification of a FM radio RF signal and outputting the signal to an antenna for transmission. In this regard, the gain of the PA 208 may be adjustable and may enable transmitting signals of varying strength. Accordingly, the PA 208 may receive one or more control signals from a processor such as the processors 125 and 129.

The antennas 210a and 210b may comprise suitable logic, circuitry, and/or code that may enable reception and/or transmission of signals of up to EHF. In various embodiments of the invention there may be separate transmit and receive antennas, as depicted, or there may be a single antenna for both transmit and receive functions.

The mode switch 214 may comprise suitable logic, circuitry, and/or code that may enable controlling the routing of the output of the PA 208. A calibration mode may communicatively couple the output of the PA 208 to the PA calibration block 212. A Tx mode may communicatively couple the output of the PA 208 to the antenna 210b for transmission of data.

The PA calibration block 212 may comprise suitable logic, circuitry, and/or code for characterizing and/or controlling a PA such that signal strength may be accurately determined and/or controlled. In this regard, characterizing a PA may involve, for example, determining output power vs. a voltage on one or more bias points of the PA. Additionally, calibrating the PA may, for example, comprise establishing necessary bias points to output desired power levels. Details of an exemplary PA calibration block may be found in FIG. 3.

In an exemplary receive operation, RF signals may be received by the antenna 210a and may be conveyed to the LNA 206. The LNA 206 may amplify the received signal and convey it to the mixer 204a. In this regard, the gain of the LNA may be adjusted based on received signal strength. Additionally, the gain may be controlled via one or more control signals from, for example, a processor such as the processors 125 and 129. The LO signal 416 may be coupled to the mixer 204a such that the received signal of frequency $F_{RF}$ may be down-converted to a baseband signal 212. The baseband signal 212 may be conveyed, for example, to a baseband processor such as the baseband processor 129.

In an exemplary transmit operation, a baseband signal 214 may be conveyed to the mixer 204b. The LO signal 416 may be coupled to the mixer 204b and the baseband signal 214, of frequency $F_{baseband}$, may be up-converted to RF. The RF signal may be conveyed to the PA 208 for transmission via the antenna 210b. In this regard, the gain of the PA 208 may be adjusted via one or more control signals from, for example, a processor such as the processors 125 and 129.

Prior to transmission of data, the PA calibration block 212 may be utilized to characterize and/or calibrate the PA 206. For example, the PA 206 may be calibrated each time the RF communication device of FIG. 1 is powered up. In this regard, an amount of power transmitted by the PA 206 may be important for reasons such as extending battery life and/or remaining compliant with regulations such as those imposed by the FCC in the USA. Accordingly, aspects of the invention may enable accurately characterizing and calibrating the PA 206. For example, capacitances, resistances, bias points and/or other adjustable aspects and/or components of the PA 206 may be adjusted in order to determine configurations which result in desired output powers.

Figure 3:
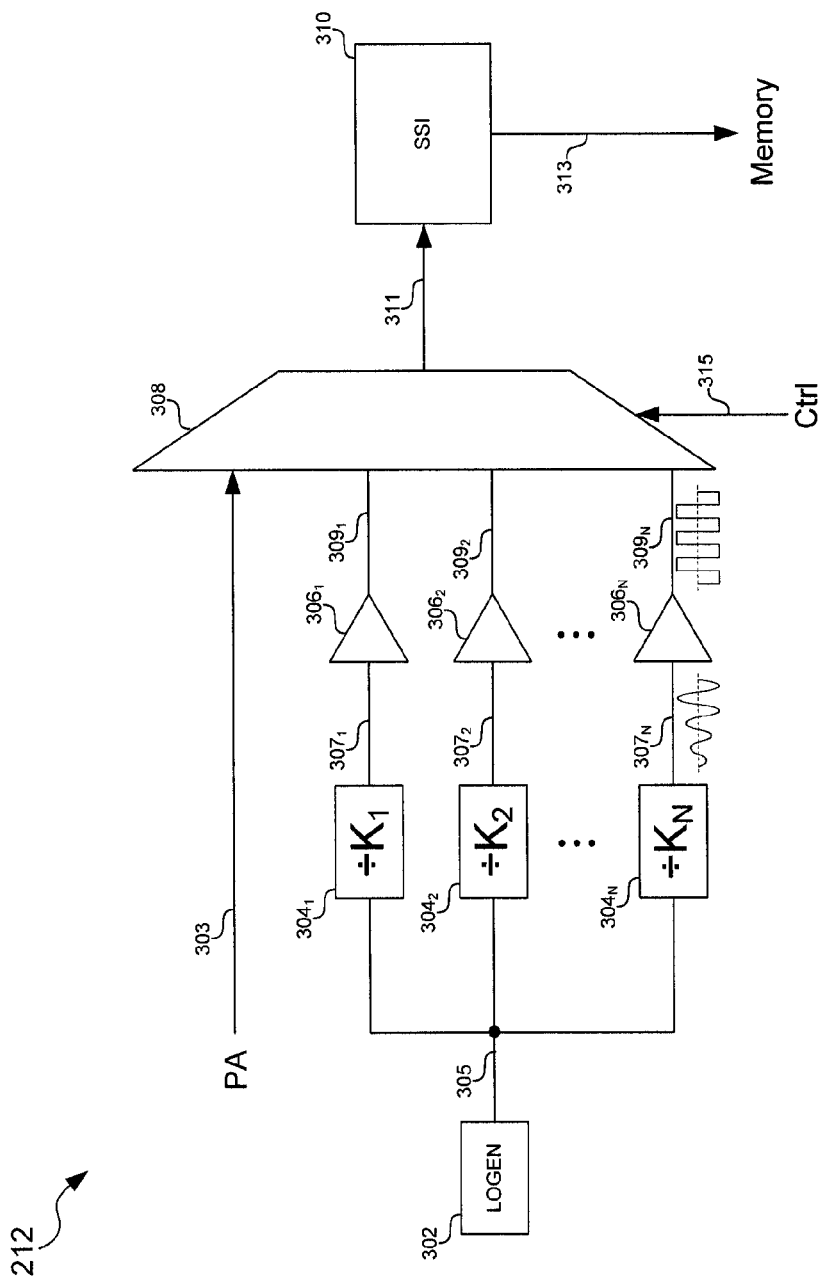
FIG. 3 is a block diagram illustrating an exemplary system for calibrating a power amplifier, in accordance with an embodiment of the invention.

FIG. 3 is a block diagram illustrating an exemplary system for calibrating a power amplifier, in accordance with an embodiment of the invention. Referring to FIG. 3 the PA calibration system 212 may comprise a local oscillator generator (LOGEN) 302, a plurality of frequency dividers $304_1, \ldots, 304_N$, a plurality of level restoration/limiting blocks $306_1, \ldots, 306_N$, a switching element 308, and a signal strength indicator (SSI) 310.

The LOGEN 302 may comprise suitable logic, circuitry, and/or code that may enable generating a reference signal. In this regard, the LOGEN 302 may be similar to or the same as the LOGEN 202 of FIG. 2.

The frequency dividers $304_1, \ldots, 304_N$ may each comprise suitable logic, circuitry, and/or code for receiving a first, higher, frequency and outputting a second, lower, frequency. The number of frequency dividers, 'N', may be different in various embodiments of the invention. Additionally, the scaling factors, $K_1, \ldots, K_N$, of the dividers $304_1, \ldots, 304_N$ may be different in various embodiments of the invention. In the exemplary embodiment of the invention depicted each divider $304_i$ may output a signal of frequency that is $1/K_i$ the frequency input to the divider $304_i$.

The level restoration/limiting block $306_1, \ldots, 306_N$ may comprise suitable logic, circuitry, and/or code that may enable receiving signals of variable amplitude and outputting signals of a constant amplitude. For example, the level restoration/limiting block $306_N$ may output a signal $309_N$ based on the signal $307_N$. In this regard, $309_N$ may have the same frequency and/or phase of the signal $307_N$ but may swing full-scale regardless of the amplitude of the signal $307_N$. In this manner, the level restoration/limiting blocks $306_1, \ldots, 306_N$ may enable the signals $309_1, \ldots, 309_N$ to all be of equal power, voltage, and/or current, or at least within a determined range of power, voltage, and/or current. Additionally, the level restoration/limiting blocks $306_1, \ldots, 306_N$ may be configurable such that power, voltage, and/or current of the signals $309_1, \ldots, 309_N$ may be adjustable.

The switching element 308 may comprise suitable logic, circuitry, and/or code that may enable selecting which signal(s) to route to the SSI 310. In this regard, the switching element 308 may be programmatically controlled in order to enable characterizing and/or calibrating the SSI 310 and/or the PA 208 of FIG. 2.

The SSI 310 may comprise suitable logic, circuitry, and/or code that may enable determining signal. In this regard, the SSI 310 may, for example, be enabled to measure current, voltage and/or power of the signal 311. Additionally, the SSI 310 may be enabled to convey measurement results to the control block 311. In various embodiments of the invention, the SSI 310 may output one or more digital and/or analog signals 313 representative of the current, voltage and/or power of the signal 311.

In operation, the SSI 310 may be characterized so that accuracy of readings taken from the SSI 310 may be determined. In this regard, the ctrl signal 315 may sequentially select signals $309_1, \ldots, 309_N$ to be routed as the signal 311 such that for each signal $309_i$ the measured voltage, current, and/or power may be recorded.

Since the signal strength of the signal $309_i$ may be known, the measured value vs. the actual value for frequency $f_i$ may be determined. In this manner, the frequency response of the SSI 310 may be determined such that a frequency dependant correction may be applied to signal strength measurements from the SSI 310. Additionally, the strength of the signal $309_i$ may be swept over a range of signal strengths such that measured value vs. actual value for signal strength $S_i$ may be determined. In this manner, a signal strength dependent correction may be applied to signal strength measurements from the SSI 310.

One or more look-up tables or similar data structures may be generated to record, for example, a correction factor vs. frequency for the SSI 310 and/or a correction factor vs. signal strength for the SSI 310. The look-up table or similar data structure may be stored in a memory such as the memory 127 of FIG. 1, and the ctrl signal may be provided by a processor such as the processor 125 or 129 of FIG. 1.

After characterizing the SSI 310, the PA 208 of FIG. 2, may be calibrated. In this regard, the ctrl signal 315 may configure the switching element 308 to select the signal 303. Subsequently, the PA 208 may be swept across a range of frequencies and/or a range of signal strengths and the signal strengths may be measured by the SSI 310. The measured signal strength of the PA 208 output may be adjusted and/or corrected based on the characterization of the SSI 310. In this manner, an accurate measurement of signal strength output by the PA 208 over a range of frequencies and signal strengths may be determined. Accordingly, various parameters of the PA 208, such as bias points, may be adjusted over frequency and/or signal strength in order to meet transmission requirements of the PA 208. In this regard, one or more look-up tables or similar data structures may be generated to record, for example, bias point vs. frequency and/or signal strength for the PA 208. The look-up table or similar data structure may be stored in a memory such as the memory 127 of FIG. 1 and the ctrl signal may be provided by a processor such as the processor 125 or 129 of FIG. 1.

Figure 4A:
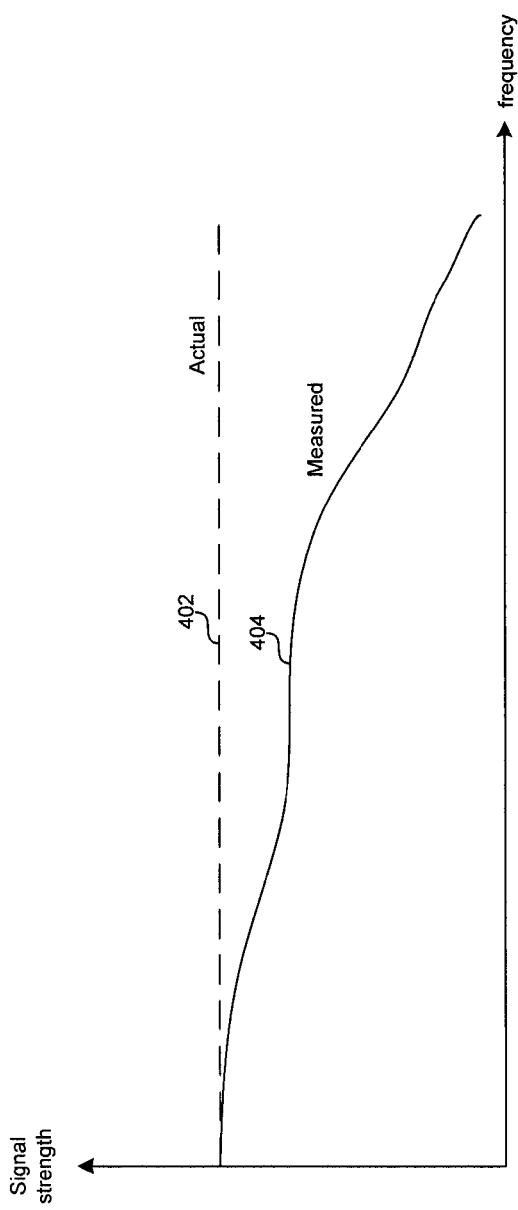
FIG. 4A illustrates an exemplary characterization of a signal strength indicator over frequency, in accordance with an embodiment of the invention.

FIG. 4A illustrates an exemplary characterization of a signal strength indicator over frequency, in accordance with an embodiment of the invention. Referring to FIG. 4A there is shown the actual signal strength 402 of signals input to the SSI 310, and the measured signal strength 404 output by the SSI 310. In this regard, a constant, known, signal strength may be input to the SSI 310 and aspects of the invention may enable determining the difference between the actual signal strength 402 and the measured signal strength 404. Accordingly, one or more correction factors may be determined in order to compensate for non-idealities in the SSI 310. In this manner, a look-up table or similar data structure may be generated to enable adjusting and/or correcting signal strength measurements. In this regard, the look-up table or similar data structure may be stored in a memory such as the memory 127 of FIG. 1. The characterization depicted in FIG. 4A is exemplary and actual characteristics and/or performance of an SSI over frequency may be different without deviating from the scope of the invention.

Figure 4B:
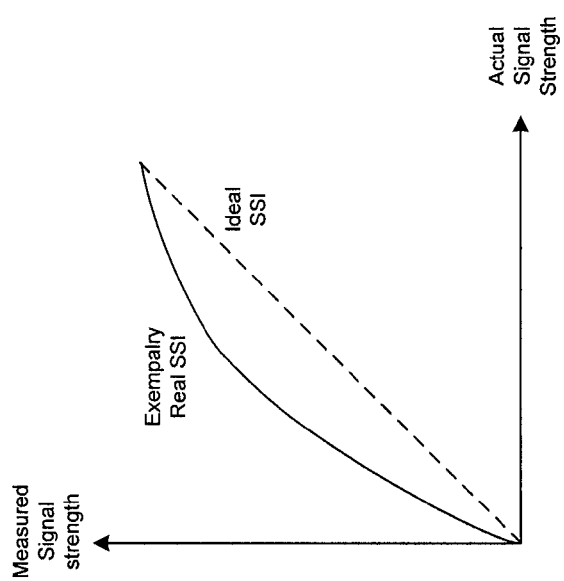
FIG. 4B illustrates an exemplary characterization of a signal strength indicator over a range of input signal strengths, in accordance with an embodiment of the invention.

FIG. 4B illustrates an exemplary characterization of a signal strength indicator over a range of input signal strengths, in accordance with an embodiment of the invention. Referring to FIG. 4B there is shown a plot of measured signal strength vs. actual signal strength. In this regard, for an ideal SSI there may be a linear relationship between actual signal strength and measured signal strength. However, in a real SSI integrated into an RF front end, for example, the measured signal strength may not be equal to actual signal strength. Moreover, measured signal strength vs. actual signal strength may not be a linear relationship. Accordingly, one or more correction factors may be determined in order to compensate for non-idealities in the SSI 310. In this manner, a look-up table or similar data structure may be generated to enable adjusting/correcting signal strength measurements. In this regard, the look-up table or similar data structure may be stored in a memory such as the memory 127 of FIG. 1. The characterization depicted in FIG. 4B is exemplary and actual characteristics and/or performance of an SSI may be different without deviating from the scope of the invention.

Figure 5:
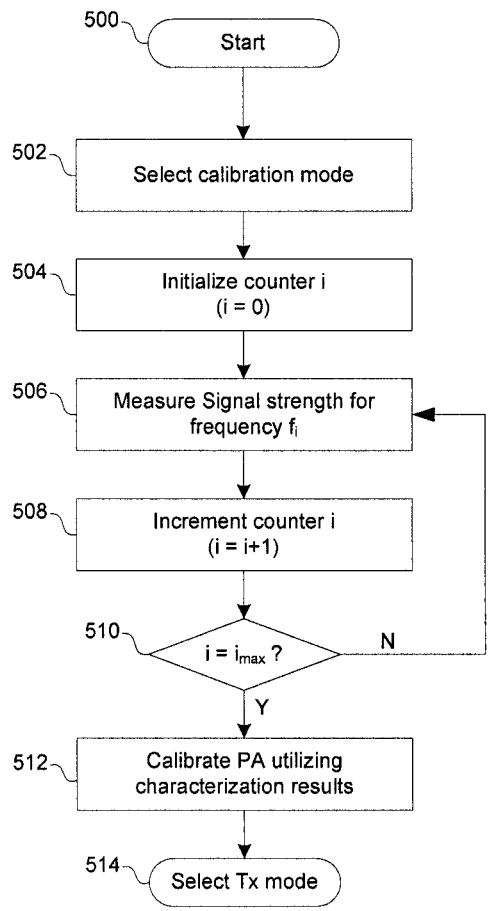
FIG. 5 is a flow chart illustrating exemplary steps for characterizing a signal strength indicator over a range of frequencies, in accordance with an embodiment of the invention.

FIG. 5 is a flow chart illustrating exemplary steps for characterizing a signal strength indicator over a range of frequencies, in accordance with an embodiment of the invention. Referring to FIG. 5, the exemplary steps may begin with start step 500. Subsequent to step 500, the exemplary steps may advance to step 502. In step 502, the transceiver 200 may, via the mode switch 214, be configured for calibration mode. Subsequent to step 502, the exemplary steps may advance to step 504. In step 504, a counter, 'i', may be initialized to 0 to enable characterizing an SSI. Subsequent to step 504, the exemplary steps may advance to step 506. In step 506, the signal strength of a reference signal of frequency $f_i$, may be measured and may be stored to a memory. In this regard, the expected vs. measured signal strength may be determined and a corresponding correction factor or factors may be determined for the frequency $f_i$. Subsequent to step 506, the exemplary steps may advance to step 508. In step 508, the counter 'i' may be incremented by 1. Subsequent to step 508, the exemplary steps may advance to step 510. In step 510, it may be determined whether the counter 'i' has reached a determined maximum value. In this regard, the maximum value of 'i' may determine how many sample measurements may be utilized to characterize the SSI. Moreover, the maximum value of 'i', combined with a frequency step size associated with each increase in 'i' may determine a frequency range over which the SSI may be characterized. If, in step 510, 'i' is not equal to a maximum value, then the exemplary steps may return to step 506. In this manner, a reference signal of constant signal strength may be swept across a range of frequencies and the corresponding signal strength measurements may be recorded.

Figure 7:
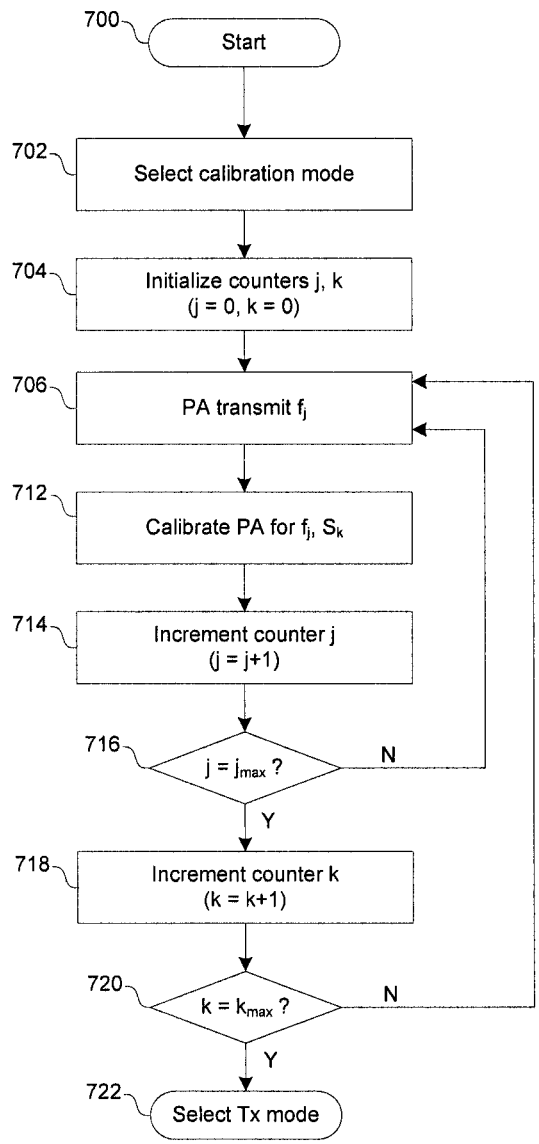
FIG. 7 is a flow chart illustrating exemplary steps for calibrating a power amplifier, in accordance with an embodiment of the invention.

Returning to step 510, if 'i' is equal to a maximum value then the exemplary steps may advance to step 512. In step 512, the PA may be calibrated utilizing the results obtained in steps 504 through 510. In this regard, details of calibrating the PA are illustrated in FIG. 7.

Figure 6:
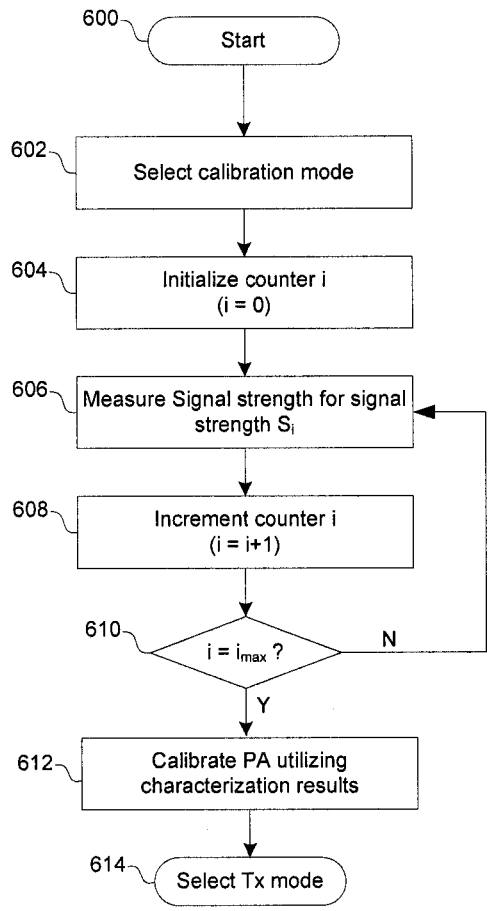
FIG. 6 is a flow chart illustrating exemplary steps for characterizing a signal strength indicator over a range of signal strengths, in accordance with an embodiment of the invention.

FIG. 6 is a flow chart illustrating exemplary steps for characterizing a signal strength indicator over a range of signal strengths, in accordance with an embodiment of the invention. Referring to FIG. 6, the exemplary steps may begin with start step 600. Subsequent to step 600, the exemplary steps may advance to step 602. In step 602, the transceiver 200 may, via the mode switch 214, be configured for calibration mode. Subsequent to step 602, the exemplary steps may advance to step 604. In step 604, a counter, 'i', may be initialized to 0 to enable characterizing an SSI. Subsequent to step 604, the exemplary steps may advance to step 606. In step 606, the signal strength of reference signal of strength $S_i$ may be measured and may be stored to a memory. In this regard, the expected vs. measured signal strength may be determined and a corresponding correction factor or factors may be determined for the signal strength $S_i$. Subsequent to step 606, the exemplary steps may advance to step 608. In step 608, the counter 'i' may be incremented by 1.

Subsequent to step 608, the exemplary steps may advance to step 610. In step 610, it may be determined whether the counter 'i' has reached a determined maximum value. In this regard, the maximum value of 'i' may determine how many sample measurements may be utilized to characterize a SSI. Moreover, the maximum value of 'i', combined with a voltage or current step size associated with each increase in 'i' may determine a range of signal strengths over which the SSI may be characterized. If, in step 610, 'i' is not equal to a maximum value, then the exemplary steps may return to step 606. In this manner, a reference signal may be swept across a range of signal strengths and the corresponding signal strength measurements may be recorded.

Returning to step 610, if 'i' is equal to a maximum value then the exemplary steps may advance to step 612. In step 612, the PA may be calibrated utilizing the results obtained in steps 604 through 610. In this regard, details of calibrating the PA are illustrated in FIG. 7.

FIG. 7 is a flow chart illustrating exemplary steps for calibrating a power amplifier, in accordance with an embodiment of the invention. Referring to FIG. 7 the exemplary steps may begin with start step 700. Subsequent to step 700, the exemplary steps may advance to step 702. In step 702, the transceiver 200 may, via the mode switch 214, be configured for calibration mode. Subsequent to step 702, the exemplary steps may advance to step 704. In step 704, counters, 'j' and 'k', may be initialized to 0 to enable calibrating the PA 208. Subsequent to step 704, the exemplary steps may advance to step 706. In step 706, the PA 208 may be configured to transmit at frequency $f_j$. Subsequent to step 706, the exemplary steps may advance to step 712. In step 712, the PA 208 may be calibrated to output signal strength $S_k$ at frequency $f_j$. For example, one or more bias points of the PA 208 may be adjusted in order to determine a configuration of the PA 208 which transmits signal strength $S_k$ at frequency $f_j$. In this regard, the SSI 310 may be utilized to calibrate the PA 208 for one or more signal strengths at the frequency $f_j$. Moreover, measurements from the SSI 310 may be adjusted and/or corrected based on a characterization of the SSI 310. Accordingly, characterization of the SSI 310 may be as described in FIG. 5 and/or 6. In certain instances, $f_j$ may correspond directly to a value of $f_i$ (FIG. 5), in which case the adjustment/correction may be determined directly. In other instances, an adjustment/correction at $f_j$ may be interpolated from two or more values of $f_i$ (FIG. 5).

Subsequent to step 712, the exemplary steps may advance to step 714. In step 714 the counter, 'j', may be incremented by 1. Subsequent to step 714, the exemplary steps may advance to step 716. In step 716, it may be determined whether the counter 'j' has reached a determined maximum value. In this regard, the maximum value of 'j' may determine how many transmit frequencies the PA 208 may be calibrated for. Moreover, the maximum value of 'j', combined with a frequency step size associated with each increase in 'j' may determine a frequency range over which the PA 208 may be calibrated. If, in step 716, 'j' is not equal to a maximum value, then the exemplary steps may return to step 706.

Returning to step 716, if 'j' is equal to a maximum value, the exemplary steps may advance to step 718. In step 718, the counter, 'k', may be incremented by 1. Subsequent to step 718, the exemplary steps may advance to step 720. In step 720, it may be determined whether the counter 'k' has reached a determined maximum value. In this regard, the maximum value of 'k' may determine how many signal strength levels the PA 208 may be calibrated for. Moreover, the maximum value of 'k', combined with a signal strength step size associated with each increase in 'k' may determine a range of signal strengths over which the PA 208 may be calibrated. For example, in one embodiment of the invention, 'k' may be equal to 2 and the PA 208 may be calibrated for "high power" transmission and "low power" transmission. If, in step 720, 'k' is not equal to a maximum value, then the exemplary steps may return to step 706.

Returning to step 720, if 'k' is equal to a maximum value, then the exemplary steps may advance to step 722. In step 722, the transceiver 200 may be configured, via the mode switch, for signal transmission.

Aspects of a method and system for calibrating a power amplifier are provided. In this regard, one or more reference signals, such as the signals $309_1, \ldots, 309_N$ of FIG. 3, may be generated and may be utilized to characterize a signal strength indicator (SSI), such as the SSI 310 of FIG. 3. Additionally, measurements of power output by a power amplifier by the SSI may be corrected based on the characterization of the SSI. Accordingly, the power amplifier, such as the PA 208 of FIG. 2, may be adjusted based on the corrected measurements. The reference signals utilized to characterize the SSI may be limited, by limiting/level restoration blocks 304, for example, to a determined range. In this regard, signal strength of the reference signals, as measured by the SSI, may be compared to the expected signal strength in order to characterize the SSI. The SSI may be characterized over a range of frequencies and/or signal strengths. Similarly the power amplifier may be adjusted over a range of frequencies and/or signal strengths.

Another embodiment of the invention may provide a machine-readable storage, having stored thereon, a computer program having at least one code section executable by a machine, thereby causing the machine to perform the steps as described herein for calibrating a power amplifier.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communications, the method comprising:
generating one or more reference signals;
characterizing a signal strength indicator utilizing said one or more reference signals;
measuring an output power of a power amplifier and correcting a value of said measured output power based on said characterization; and
adjusting said power amplifier based on said corrected value of said measured output power.

2. The method according to claim 1, comprising limiting a signal strength of said one or more reference signals to a determined range.

3. The method according to claim 1, comprising characterizing said signal strength indicator by comparing signal strength of said one or more reference signals as measured by said signal strength indicator, and expected signal strength of said one or more reference signals.

4. The method according to claim 1, comprising characterizing said signal strength indicator over a range of frequencies.

5. The method according to claim 1, comprising characterizing said signal strength indicator over a range of signal strengths.

6. The method according to claim 1, comprising characterizing said signal strength indicator over a range of frequencies and over a range of signal strengths.

7. The method according to claim 1, comprising adjusting said power amplifier over a plurality of frequencies.

8. The method according to claim 1, comprising adjusting said power amplifier over a plurality of signal strengths.

9. A machine-readable storage having stored thereon, a computer program having at least one code section for communications, the at least one code section being executable by a machine for causing the machine to perform steps comprising:
generating one or more reference signals;
characterizing a signal strength indicator utilizing said one or more reference signals;
measuring an output power of a power amplifier and correcting a value of said measured output power based on said characterization; and
adjusting said power amplifier based on said corrected value of said measured output power.

10. The machine-readable storage according to claim 9, wherein said at least one code section enables limiting a signal strength of said one or more reference signals to a determined range.

11. The machine-readable storage according to claim 9, wherein said at least one code section enables characterizing said signal strength indicator by comparing signal strength of said one or more reference signals as measured by said signal strength indicator, and expected signal strength of said one or more reference signals.

12. The machine-readable storage according to claim 9, wherein said at least one code section enables characterizing said signal strength indicator over a range of frequencies.

13. The machine-readable storage according to claim 9, wherein said at least one code section enables characterizing said signal strength indicator over a range of signal strengths.

14. The machine-readable storage according to claim 9, wherein said at least one code section enables characterizing said signal strength indicator over a range of frequencies and over a range of signal strengths.

15. The machine-readable storage according to claim 9, wherein said at least one code section enables adjusting said power amplifier over a plurality of frequencies.

16. The machine-readable storage according to claim 9, wherein said at least one code section enables adjusting said power amplifier over a plurality of signal strengths.

17. A system for communications, the system comprising:
    one or more circuits for generating one or more reference signals;
    said one or more circuits for characterizing a signal strength indicator utilizing said one or more reference signals;
    said one or more circuits for measuring an output power of a power amplifier and correcting a value of said measured output power based on said characterization; and
    said one or more circuits for adjusting said power amplifier based on said corrected value of said measured output power.

18. The system according to claim 17, wherein said one or more circuits enable limiting a signal strength of said one or more reference signals to a determined range.

19. The system according to claim 17, wherein said one or more circuits enable characterizing said signal strength indicator by comparing signal strength of said one or more reference signals as measured by said signal strength indicator, and expected signal strength of said one or more reference signals.

20. The system according to claim 17, wherein said one or more circuits enable characterizing said signal strength indicator over a range of frequencies.

21. The system according to claim 17, wherein said one or more circuits enable characterizing said signal strength indicator over a range of signal strengths.

22. The system according to claim 17, wherein said one or more circuits enable characterizing said signal strength indicator over a range of frequencies and over a range of signal strengths.

23. The system according to claim 17, wherein said one or more circuits enable adjusting said power amplifier over a plurality of frequencies.

24. The system according to claim 17, wherein said one or more circuits enable adjusting said power amplifier over a plurality of signal strengths.

\* \* \* \* \*